United States Patent [19]

Nagaoka et al.

[11] Patent Number: 5,246,158
[45] Date of Patent: Sep. 21, 1993

[54] METHOD OF MANUFACTURING A SELECTIVE ISOLATION SCREEN

[75] Inventors: Tadayoshi Nagaoka, Mihara, Japan; Derry D. Sparlin, Spring, Tex.

[73] Assignee: Nagaoka International Corp., Japan

[21] Appl. No.: 992,557

[22] Filed: Dec. 18, 1992

[30] Foreign Application Priority Data

Dec. 27, 1991 [JP] Japan ............... 3-360494

[51] Int. Cl.5 .......................... B23K 31/02
[52] U.S. Cl. .......................... 228/175; 228/189; 156/144; 29/163.7; 166/236
[58] Field of Search .......................... 228/175, 182, 189; 156/143, 144, 187; 29/163.7; 166/227, 233–236

[56] References Cited

U.S. PATENT DOCUMENTS

| | | | |
|---|---|---|---|
| 77,772 | 5/1868 | Skilling | 166/233 |
| 4,771,829 | 9/1988 | Sparlin | 166/233 |
| 5,094,360 | 3/1992 | Lange | 228/182 |
| 5,172,477 | 12/1992 | Hadley | 228/182 |

Primary Examiner—Samuel M. Heinrich
Attorney, Agent, or Firm—Hedman, Gibson & Costigan

[57] ABSTRACT

A method of manufacturing a selective isolation screen includes steps of preparing for a tubular screen provided with spacer members and a wire on a base member, and supplying sealing material from a sealing material supply device which supplies sealing material at a location where sealing is required on the tubular screen while rotating the sealing material supply device relative to the tubular screen thereby filling the annulus between the spacer members which are adjacent to each other in the circumferential direction to form seal means. Difficulty in welding can thereby be avoided and location and state of mounting of sleeves can be visually checked.

6 Claims, 3 Drawing Sheets

METHOD OF MANUFACTURING A SELECTIVE ISOLATION SCREEN

BACKGROUND OF THE INVENTION

This invention relates to a well screen such as an oil well screen and, more particularly, to a method of manufacturing a selective isolation screen in which, in a wire wrapped screen, seal means for isolating and sealing annulus defined by spacer members disposed on the outer surface of a base member such as a slitted pipe is provided at selected locations in the longitudinal direction.

A screen which is used most frequently as a deep well screen such as an oil well screen has a perforated pipe formed with multitudes of circular openings or slits as its base member, a plurality of spacer rods extending in the longitudinal direction arranged at intervals in the circumferential direction on the outer surface of the base member and a wire wound spirally on the outer periphery of the spacer rods with a predetermined gap. By the provision of the spacer rods, annulus defined by the spacer members and extending in the longitudinal direction is formed between the inside of the wire and the outer surface of the base member over the entire periphery of the base member.

This annulus defined between the inside of the wire and the outer surface of the base member is indispensable for securing a sufficient flow rate of fluid by enabling fluid flowing from the gap of the wire to flow uniformly to openings of the base member. The provision of the annulus, however, causes the following problems.

In a case where plugging has occurred in a screen, an operation is made for dissolving or removing materials which have caused plugging by locally injecting liquid such as hydrochloric acid, diesel oil, light oil or surfectant under pressure in the radial direction from inside of the base member. This liquid, however, is dispersed vertically through the annulus and, as a result, a sufficient amount of liquid is not injected concentrically to the location at which the plugging has occurred and dissolving or removal of the plugging materials is not achieved to an expected degree.

In a screen of a type in which gravel is filled in a wellbore about the screen for preventing entering of sand into the wellbore by the filled gravel, fluid is injected towards the gravel in the radial direction from the inside of the base member when gravel is filled in the wellbore to force the gravel down by the pressure of the fluid injected. In this case also, the fluid injected is dispersed vertically through the annulus so that gravel does not move down as expected with resulting loss of uniformity in the distribution of gravel in the wellbore and reduction in the effect of preventing entering of sand into the screen.

For overcoming the above described problems, U.S. Pat. No. 4,771,829 proposes a selective isolation screen in which seal means for isolating and sealing annulus extending in the longitudinal direction defined by spacer rods of the above described type of screen are provided at selected locations in the longitudinal direction. In this screen, as shown in FIG. 3, a plurality of spacer rods b are arranged on the outer surface of a base member a consisting of a perforated pipe, a wire c is spirally wound on the outside of the spacer rods b and cylindrical sleeves e having the same radial length as the radial length of the spacer rods b are disposed inside of the wire c at selected locations at intervals in the longitudinal direction and fixed to the spacer rods b. By disposing these sleeves e which constitute the seal means at selected locations in the longitudinal direction, the annulus defined by the spacer rods and extending in the longitudinal direction is isolated and sealed in the longitudinal direction. Accordingly, in taking a step for removing plugging or filling gravel in a wellbore, fluid injected from the inside of the base member in a screen section where plugging has occurred or gravel to be forced down exists is injected radially towards the wellbore through the gap of the wire c, for the vertical flow of the fluid in the annulus is restricted by the sleeves e provided at the upper and lower locations of the screen section where the fluid is injected.

As described above, the selective isolation screen is useful for achieving effectively removal of plugging and flow down of gravel but the prior art selective isolation screen has the following problem.

In the prior art selective isolation screen, as shown in FIG. 3, the wire c is wound over the sleeves e. The wire c is normally spot-welded to the spacer rods b. Since, as is well known, spot-welding is effected by concentrating electric current at a relatively small area to heat it locally, it is extremely difficult to spot-weld the wire c to the surface of the sleeves e which have a relatively broad area as shown in FIG. 3.

Further, in the prior art selective isolation screen, the sleeves e are covered by the wire c and the gap of the wire c is normally of a very small value of about 0.3 mm and, accordingly, the sleeves e are not seen from the outside and locations and state of mounting of the sleeves e cannot be visually checked. This structure is inconvenient in that the screen has to be used without checking the state of the sleeves even if some there is defect in mounting of a sleeve.

It is, therefore, an object of the invention to overcome the above described problem of the prior art selective isolation screen and provide a method of manufacturing a selective isolation screen in which difficulty in welding work can be avoided and location and state of mounting of the sleeves can be readily checked visually.

SUMMARY OF THE INVENTION

The method achieving the above described object of the invention is a method of manufacturing a selective isolation screen which includes a base member of a generally cylindrical configuration having a plurality of openings, a plurality of spacer members extending in the longitudinal direction which are disposed, circumferentially spaced, on the outer peripheral surface of the base member, and a wire wound about the outer periphery of the spacer members with a predetermined gap, annulus defined by the spacer members and extending in the longitudinal direction being formed between the inside of the wire and the outer surface of the base member over the entire periphery of the base member, and seal means provided at selected locations in the longitudinal direction on the base member for isolating and sealing, in the longitudinal direction, the annulus defined by the spacer members and extending in the longitudinal direction, characterized in that said method comprises steps of preparing for a tubular screen provided with the spacer members and the wire on the base member, and supplying sealing material from a sealing material supply device which supplies sealing material at a location where sealing is required on the tubular screen while rotating the sealing material supply device relative to the tubular screen thereby filling the annulus between the spacer members which are adjacent to each other in the circumferential direction to form the seal means.

The seal means is formed by filling the annulus between the spacer members which are adjacent to each other in the circumferential direction with the sealing material at a location where sealing is necessary. The seal means thus formed has no wire wound thereon and, therefore, widening of the gap between the wire and the seam means does not occur and difficulty in welding can thereby be avoided. Further, state of mounting of the seal means can be visually checked and, therefore, defect in mounting of the seam means can be readily detected and necessary repair can be made.

Preferred Embodiment of the invention will be described below with reference to the accompanying drawings.

BRIEF DESCRIPTION OF THE DRAWINGS

In the accompanying drawings.

DESCRIPTION OF THE PREFERRED EMBODIMENTS

Preferred embodiments of the invention will now be described with reference to the accompanying drawings.

Figure 1:
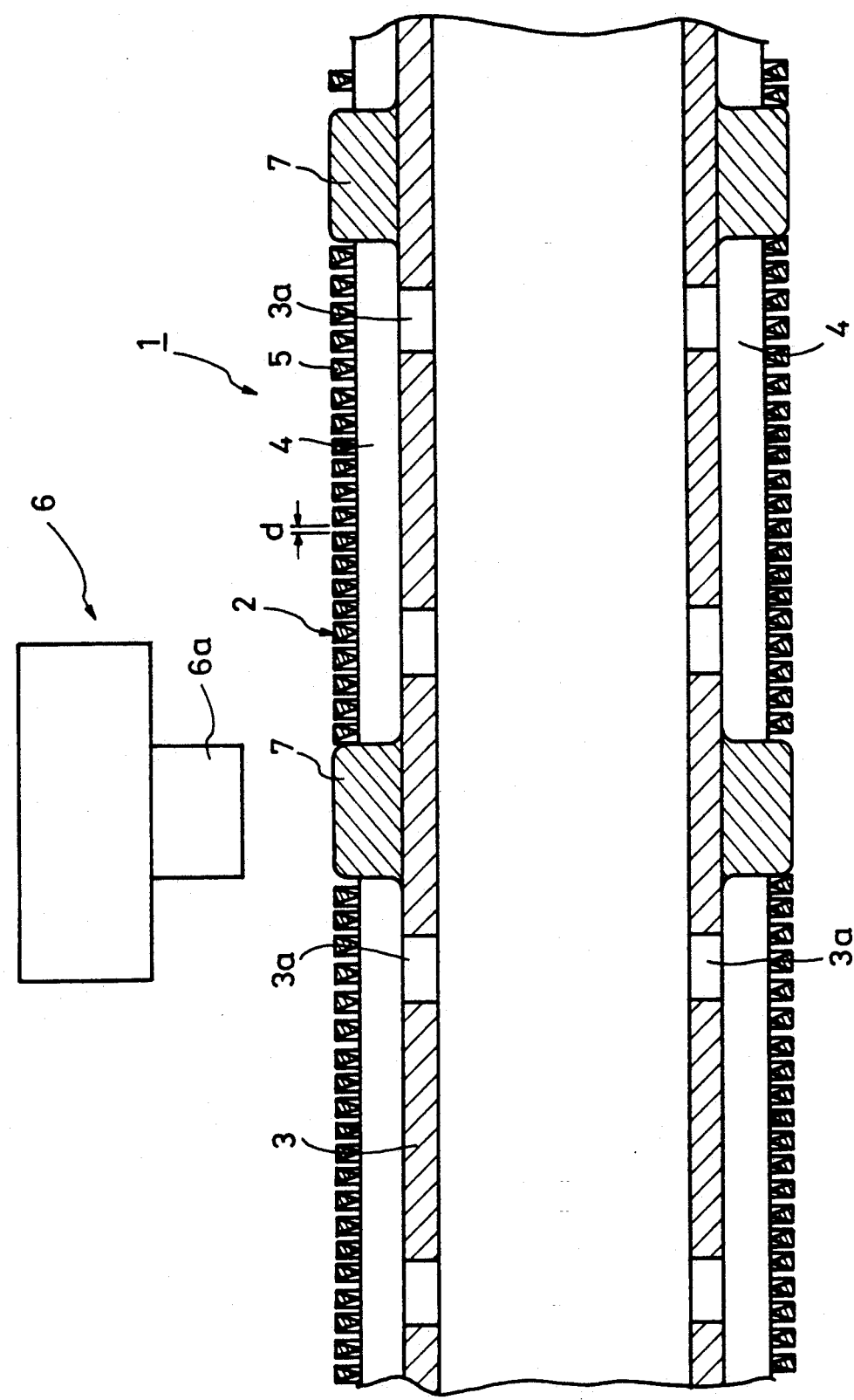
FIG. 1 is a vertical sectional view showing a part of a screen manufactured by an embodiment of the method of the invention.
Figure 2:
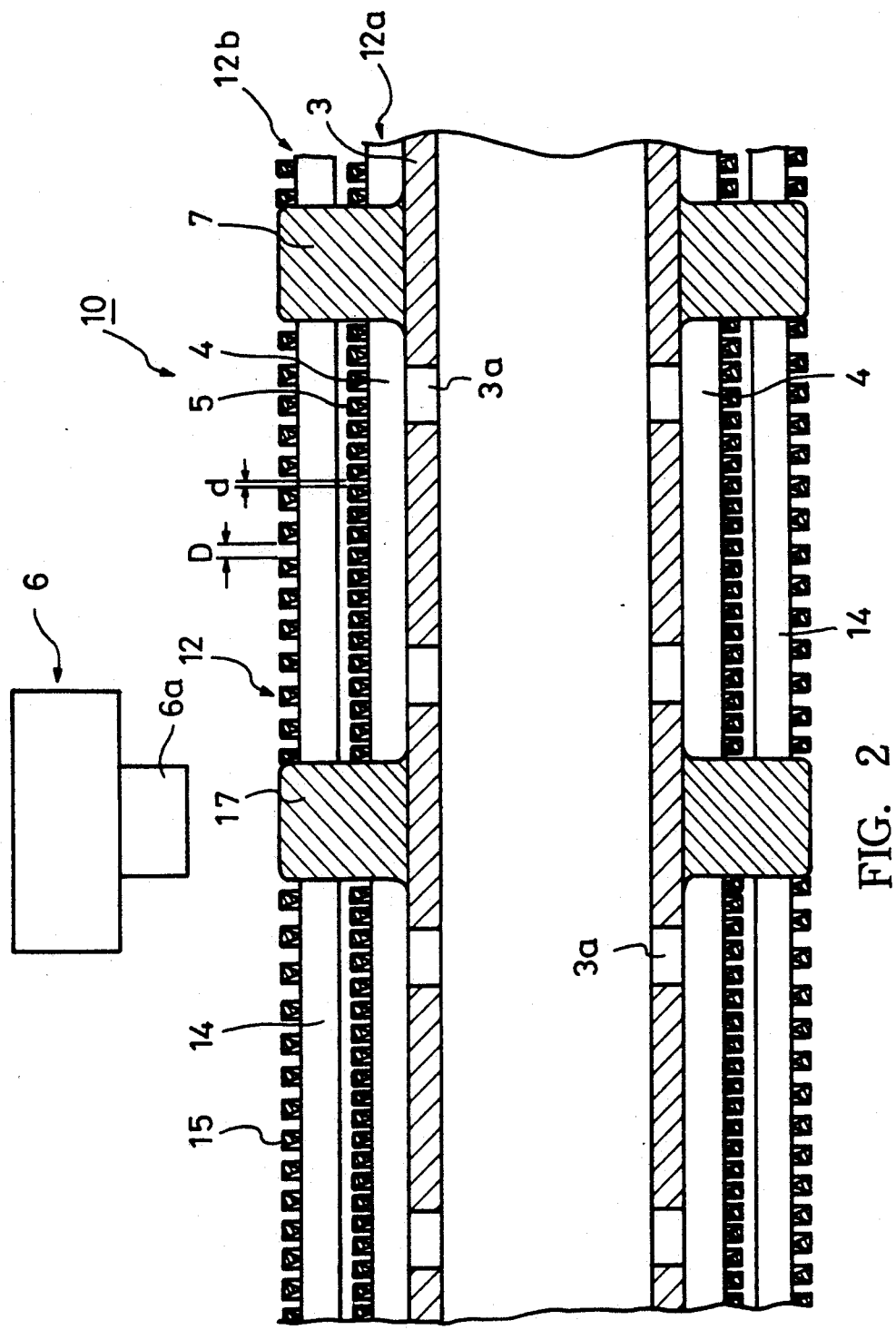
FIG. 2 is a vertical sectional view showing a part of a screen manufactured by another embodiment of the invention.
Figure 3:
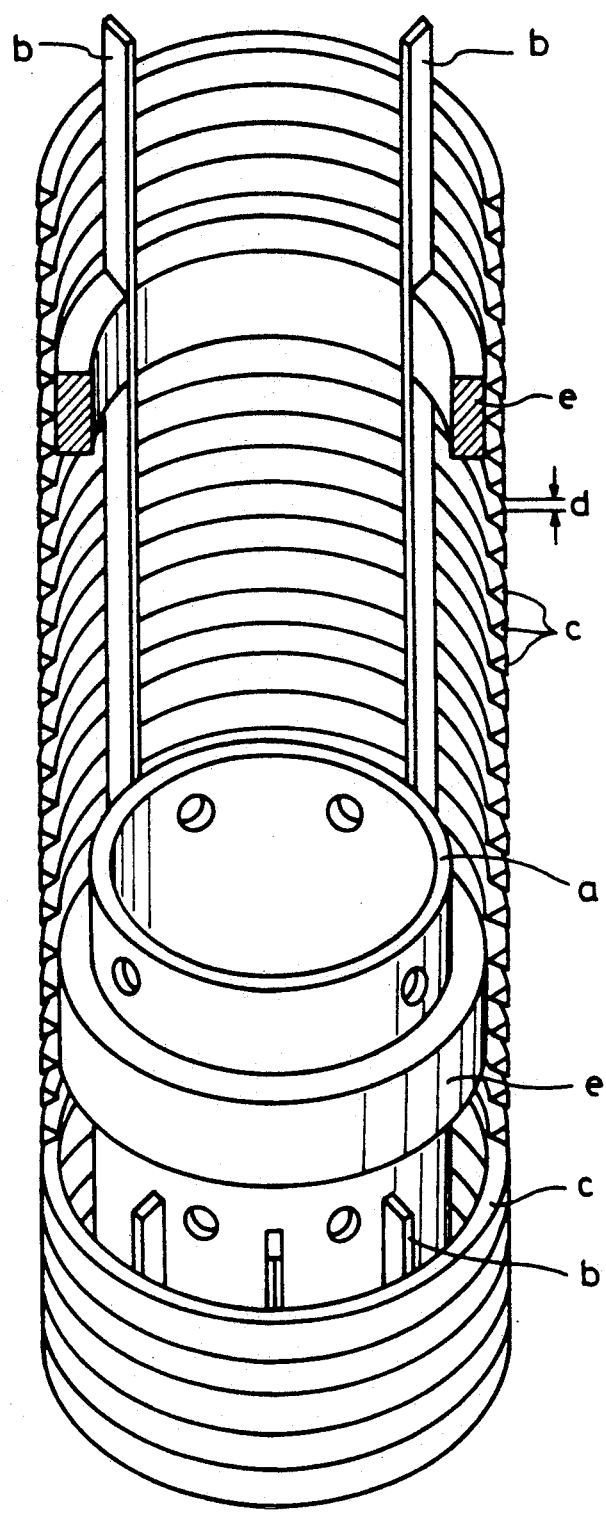
FIG. 3 is a vertical sectional view showing the prior art selective isolation screen.

FIG. 1 is a view for explaining an embodiment of the method of manufacturing a selective isolation screen according to the invention. FIG. 2 is a vertical sectional view showing a part of the screen 1 manufactured by the method of this embodiment.

A perforated pipe 3 constituting a base member is formed with a multitude of openings 3a. A plurality of spacer members 4 extending in the longitudinal direction are disposed, circumferentially spaced, on the outer surface of the perforated pipe 3 and a wire 5 is wound spirally on the outside of the spacer members 4 with a gap d of a predetermined width. An annulus defined by the spacer members 4 and extending in the longitudinal direction is formed between the inside of the wire 5 and the outer surface of the perforated pipe 3 over the entire periphery of the pipe 3.

The seal means for isolating and sealing the annulus defined by the spacer members and extending in the longitudinal direction on the tubular screen 2 formed in the above manner is formed, as illustrated, by supplying sealing material from a sealing material supply device 6 to the tubular screen 2. The sealing material supply device 6 can dispense, from a sealing material supply outlet 6a, sealing material fed from an unillustrated reservoir onto the tubular screen 2 over a predetermined length and by a predetermined amount. Accordingly, by positioning the sealing material supply device 6 above a location where sealing is necessary and rotating the tubular screen 2 by 360 degrees while dispensing the sealing material from above the wire 5, the sealing material is heaped on the outer peripheral surface of the perforated pipe 3 through a gap of the wire 5 and fills a part of the annulus between the spacer members 4 which are adjacent to each other in the circumferential direction, thereby forming a seal section 7 which isolates and seals off the annulus in the longitudinal direction. After forming the seal section 7 in this manner, the tubular screen 2 or the sealing material supply device 6 is moved to a next seal position and the same operation is repeated to form the seal section 7. By repeating this operation, plural seal sections 7 can be formed at desired locations on the tubular screen 2.

The sealing material can be selected from materials which have sufficient fluidity for flowing down through the gap of the wire 5 in forming of the seal section 7 on the tubular screen 2 and have such a nature as to solidify relatively rapidly after being deposited on the surface of the base member to heap up on the base member. Preferred materials are thermoplastic resin or rubber which is molten by heating, silicone elastomer, adhesives, cement, ceramics, plaster, lead and metal bonding material such as solder. In a case where use of acid such as hydrochloric acid is expected to prevent plugging of the screen, a material which is not dissolved or corroded by such acid should be selected.

FIG. 2 is a vertical sectional view showing a part of a screen manufactured by another embodiment of the method of the invention. In FIG. 2, the same component parts as those in FIG. 1 are designated by the same reference characters and detailed description thereof will be omitted.

In this embodiment, a tubular screen 12 is composed of an inner tubular screen 12a which consists of spacer members 4 and a wire 5 which are of the same construction as the tubular screen 2 of the embodiment shown in FIG. 1 and an outer tubular screen 12b provided outside of the inner tubular screen 12a with a predetermined gap, said outer tubular screen 1b having spacer members 14 and a wire 15 wound on the outside thereof with a gap D which is larger than the gap d. The wire 15 is spot-welded to the spacer members 14 at each crossing point with them. The wire 15 is not limited to the spiral wire as shown but a plurality of rings arranged at intervals may be welded to the spacer members 14. If necessary, the gap D may be equal to smaller than the gap d.

In a case where the screen 10 manufactured by the method of FIG. 2 is used in a horizontal well having an horizontally extending portion or an inclined well having an obliquely extending portion along an oil layer, when this screen is pushed into a well, the outer tubular screen 12b of the screen 10 passing through a bent portion of the well is deformed by the bending of the wall surface of the well. The wire 5 of the inner tubular screen 12a does not come into contact with the wall surface of the bent portion of the well but is elastically deformed inside of the outer tubular screen 12b and thereafter is restored to the original shape after reaching the horizontal portion of the well. Since the gap is provided between the spacer members 14 of the outer tubular screen 12b and the wire 5 of the inner tubular screen 12a, adjustment can be made by properly setting this gap so that the wire 5 will not contact with the spacer members 14 when the screen passes through the bent portion of the well, or, even if the wire 5 contacts the spacer members 14, the wire 5 will not be plastically deformed under the action of excessive load. According to this embodiment, therefore, damage or deformation of the screen which tends to occur when the screen 10 forced into the well passes through the bent portion of the well can be effectively prevented and the gap d of the wire 5 of the inner tubular screen 12a can be maintained at a constant value. This concentrical screen is effective for preventing formation of sand and also for protecting the screen from corrosion caused by movement of fluid and sand.

In the above described embodiments, the perforated pipe 3 is used as the base member. The base member, however, is not limited to the perforated pipe but it may be, for example, a spiral wire extending in the axial direction of the screen. Alternatively, the base member may be composed of plural rings arranged in parallel at a predetermined interval in the axial direction of the screen so as to form slits which continue in the circumferential direction of the screen. These base members are disclosed in Japanese Patent Publication No. 32275/1983.

The base member may be a cylindrical member made by winding a spiral wire on the outside of a plurality of rods arranged in the axial direction at a predetermined interval to form a cylindrical configuration and welding the rods and wire together to form an integral cylindrical body. This type of base member is used in a double cylinder type screen disclosed by Japanese Patent Publication No. 54516/1989.

In the above described embodiments, a wedge wire is used as the wires 5 and 15. The wire however is not limited to the wedge wire but wires of other cross sections such as a rhomb, circle and square may also be used. Depending upon conditions under which the wires 5 and 15 are used, these wires 5 and 15 may be welded to a part of spacer members only instead of being welded to the spacer members at all crossing points.

In the above described embodiments, the sealing material supply device 6 is fixed and the tubular screens 2 and 12 are rotated. Conversely, the sealing material supply device 6 may be rotated about the fixed tubular screen.

The length of the seal means and the screen jackets may be suitably determined depending upon the conditions of the well. The seal means may be of a length ranging from one foot to more than half the length of the base member. It is also possible to vary the lengths of plural seal means on a single base member. The length of the screen jackets is equal to a length of a portion of the base member which is not covered with the seal means or which is not required for threading or provision of a centralizer.

We claim:

1. A method of manufacturing a selective isolation screen which includes a base member of a generally cylindrical configuration having a plurality of openings, a plurality of spacer members extending in the longitudinal direction which are disposed, circumferentially spaced, on the outer peripheral surface of the base member, and a wire wound about the outer periphery of the spacer members with a predetermined gap, annulus defined by the spacer members and extending in the longitudinal direction being formed between the inside of the wire and the outer surface of the base member over the entire periphery of the base member, and seal means provided at selected locations in the longitudinal direction on the base member for isolating and sealing, in the longitudinal direction, the annulus defined by the spacer members and extending in the longitudinal direction, characterized in that said method comprises steps of:

preparing for a tubular screen provided with the spacer members and the wire on the base member; and supplying sealing material from a sealing material supply device which supplies sealing material at a location where sealing is required on the tubular screen while rotating the sealing material supply device relative to the tubular screen thereby filling the annulus between the spacer members which are adjacent to each other in the circumferential direction to form the seal means.

2. A method for manufacturing a selective isolation screen as defined in claim 1 wherein said base member is a pipe formed with multitudes of openings.

3. A method for manufacturing a selective isolation screen as defined in claim 1 wherein said base member is a spiral wire extending in the axial direction of the screen.

4. A method for manufacturing a selective isolation screen as defined in claim 1 wherein said base member is made of a plurality of rings disposed in parallel at a predetermined interval so as to form slits which continue in the circumferential direction of the screen.

5. A method for manufacturing a selective isolation screen as defined in claim 1 wherein said base member is a cylindrical member made by winding a spiral wire on the outside of a plurality of rods arranged in the axial direction at a predetermined interval to form a cylindrical configuration and welding the rods and wire together to form an integral cylindrical body.

6. A method of manufacturing a selective isolation screen as defined in claim 1 wherein said tubular screen constitutes an inner tubular screen and there is provided, on the outside of the inner tubular screen, an outer tubular screen comprising a plurality of circumferentially spaced spacer members extending in the longitudinal direction and a wire wound about the outer periphery of the spacer members with a predetermined gap.

* * * * *